(12) United States Patent
Fincato et al.

(10) Patent No.: US 7,590,326 B2
(45) Date of Patent: Sep. 15, 2009

(54) OPTICAL INTEGRATED DEVICE MANUFACTURING PROCESS AND DEVICE MANUFACTURED BY THE PROCESS THEREOF

(75) Inventors: Antonio Fincato, Cameri (IT); Ubaldo Mastromatteo, Bareggio (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 0 days.

(21) Appl. No.: 12/015,199

(22) Filed: Jan. 16, 2008

(65) Prior Publication Data

US 2008/0175531 A1  Jul. 24, 2008

(30) Foreign Application Priority Data

Jan. 18, 2007 (IT) .................. MI2007A000061

(51) Int. Cl.
G02B 6/10 (2006.01)
H01L 21/00 (2006.01)
B29D 11/00 (2006.01)

(52) U.S. Cl. ..................... 385/129; 438/31; 216/24
(58) Field of Classification Search ............. 385/14, 385/129–132; 438/31; 216/24; 264/1.24
See application file for complete search history.

(56) References Cited

U.S. PATENT DOCUMENTS 4,698,129 A * 10/1987 Puretz et al. ............ 204/192.34
4,938,841 A * 7/1990 Shahar et al. ............... 438/701
5,135,605 A * 8/1992 Blonder et al. ............... 216/47
5,894,538 A   4/1999 Presby

OTHER PUBLICATIONS

Henry, et al. "Glass Waveguides on Silicon for Hybrid Optical Packaging"; Journal of Lightwave Technology; IEEE; Oct. 1989; pp. 1530-1539; vol. 7, No. 10; US.

* cited by examiner

*Primary Examiner*—Charlie Peng
(74) *Attorney, Agent, or Firm*—Hogan & Hartson LLP

(57) ABSTRACT

The invention relates to a process for manufacturing an integrated optical device comprising the deposition on a support substrate of a multilayer being formed by first and second cladding layers in order to hold in a multilayer first region a waveguide core layer. The core is provided with an electromagnetic radiation (L) inlet/outlet port. Furthermore, the process provides for the formation of a regulation layer having a first etching speed associated therewith, which is distinguished from the etching speeds of the cladding layers. Subsequently to an etching of a multilayer second region, a cavity is obtained having a first wall which is inclined relative to the substrate at least partially extending in said first region and which is near said inlet/outlet port. Such etching removes portions of the regulation layer and the cladding layers at different speeds in order to result in the formation of the inclined wall.

24 Claims, 5 Drawing Sheets

OPTICAL INTEGRATED DEVICE MANUFACTURING PROCESS AND DEVICE MANUFACTURED BY THE PROCESS THEREOF

RELATED APPLICATION

The present application claims priority of Italian Patent Application No. MI2007A000061 filed Jan. 18, 2007, entitled PROCESSO DI FABBRICAZIONE DI UN DISPOSITIVO OTTICO INTEGRATO ET DISPOSITIVO REALIZZATO MEDIANTE IL PROCESSO.

FIELD OF THE INVENTION

The present invention relates to integrated devices and, more particularly, to a process for manufacturing optical devices comprising integrated waveguides.

BACKGROUND OF THE INVENTION

As is known, optical systems capable of transmitting high amounts of information at a considerable distance with reduced distortion are increasingly employed in the field of communication systems.

Such optical systems employ both optical devices adapted to transmit and/or receive information in the form of light signals, and optical devices such as to allow the propagation of such light signals.

For example, among the first ones the photodetectors, the optical signal transmitters, and the modulators are included, while the second ones comprise, for example, integrated waveguides typically called optical circuits by those skilled in the art.

A method for manufacturing optical devices comprising integrated waveguides on a silicon substrate is described in the document "Glass Waveguides on Silicon for Hybrid Optical Packaging", by C. H. Henry et al., 7 J. Lightwave Technol., pages 1530-1539, which is included by reference herein below. In particular, the waveguide described in such document comprises a glassy core layer having a respective refractive index. Such core layer is surrounded by glassy coating layers having a refractive index lower than the core layer index. Consequently, a light radiation propagating in the guide remains confined in the core layer.

Furthermore, hybrid optical devices are known, that is, comprising a transmitting and/or receiving optical device associated to the waveguide device. In particular, the latter waveguide device comprises a deviation wall, or turning mirror, which is inclined by a prefixed angle (for example, 45°) relative to a propagation direction of the light radiation in the guide. Such mirror is adapted to deviate such light radiation towards an active portion of the receiving device.

It should be noted that the turning mirrors are manufactured in some waveguide devices by employing metallization layers that are deposited on inclined surfaces opposite the same waveguide, and spaced by trenches from the latter.

In particular, in such devices the light signal must cover a path in the air outside the guide in order to reach the mirror and be reflected towards the receiving device. Consequently, such signal undergoes undesired spatial attenuations and dispersions following the refractive index differential between the waveguide and the air.

U.S. Pat. No. 5,894,538 discloses a method for manufacturing waveguide devices comprising turning mirrors inside the same guide. In particular, such mirrors are obtained by means of a vaporization of portions of the guide coating layers with high-energy light beams. In greater detail, such light beams are incident on the guide coating layers along directions which are inclined relative to the radiation propagation direction, in order to remove portions of such layers in the proximity of a core inlet/outlet end.

It should be noted that in the thus-obtained waveguide devices, the light radiation propagation and reflection take place essentially within the guide coating layers, thereby the light signal attenuations are reduced.

However, in order to manufacture the above-mentioned inner mirrors with an accurate and controllable inclination by conventional techniques, it is necessary to employ advanced and expensive equipments, while performing complex productive process steps.

SUMMERY OF THE INVENTION

In a preferred embodiment, the present invention relates to a process for manufacturing an integrated optical device as defined by the annexed claim 1. Preferred embodiments of the process are defined by the dependant claims.

Object of the present invention is also as integrated optical device as defined in the claim 15.

Furthermore, object of the invention is also an optical system as defined in the claim 17.

BRIEF DESCRIPTION OF THE DRAWINGS

The characteristics and advantages of the present invention will appear from the detailed description below of an exemplary and not at all limiting embodiment thereof, in relation with the annexed drawings, in which.

DETAILED DESCRIPTION OF PREFERRED EMBODIMENTS

Figure 1:
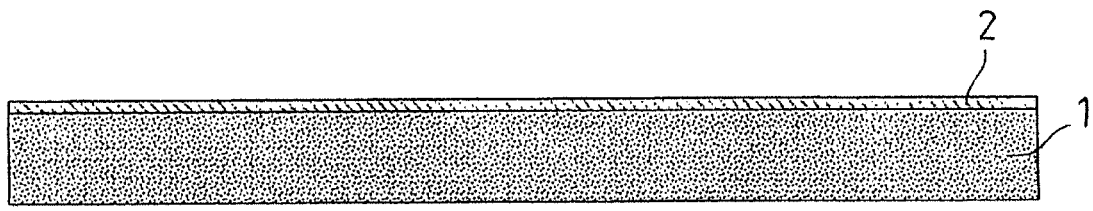
FIG. 1 shows in a sectional view a deposition step of a regulation layer on a substrate in an initial step of the process for manufacturing the waveguide integrated optical device of the present invention.
Figure 2:
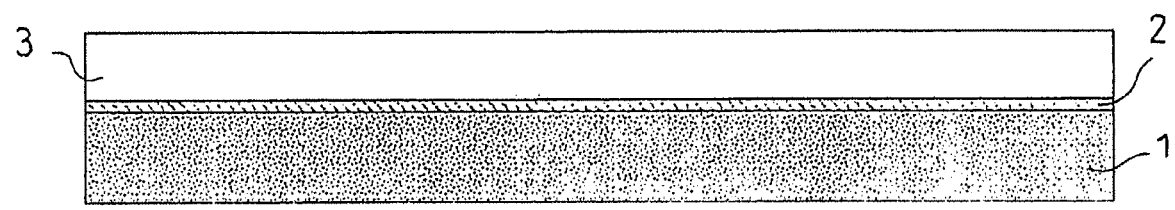
FIG. 2 shows in a sectional view a deposition step of a first coating layer of a waveguide of the device of the invention.
Figure 3:
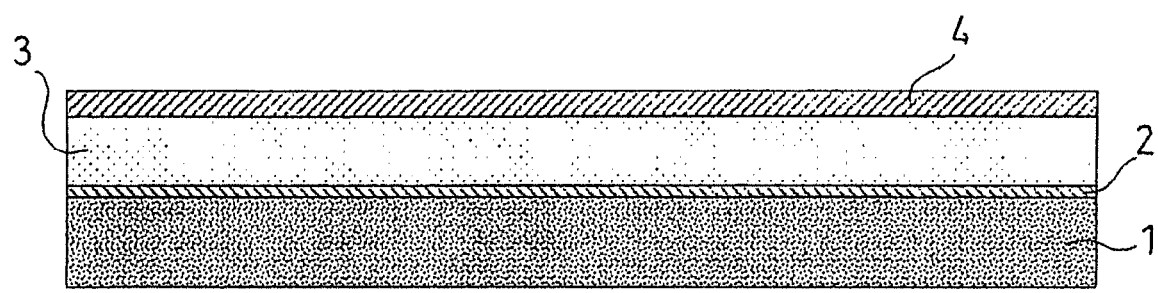
FIGS. 3 and 4 show in a sectional view formation steps of a waveguide core layer of the device of the invention.

With reference to the FIGS. 1-12, a process for manufacturing an integrated optical device 100 in accordance with an embodiment of the present invention can be described.

In particular, the above-mentioned device 100 is of the type comprising an integrated waveguide for the propagation of electromagnetic radiation. Such waveguide device 100 is also referred to by the term "optical circuit" by those skilled in the art.

It should be noted that the electromagnetic radiation propagating in the guide will be called the "light radiation" herein below for sake of simplicity. However, any type of electromagnetic radiation will be meant to be included by the term "light radiation", not only in the visible light field, but also in the field of the optical frequencies such as, for example, infrared, ultraviolet, or non-optical frequencies, such as the microwaves.

In an initial step, the process of the invention provides the formation of a regulation layer 2 on a support silicon substrate 1, usually by deposition. For example, such regulation layer 2 is in silicon dioxide ($SiO_2$) doped with impurities such as to result in a dissolution speed which varies according to the concentration in etching solution of the BOE-type (Buffered Oxide Etch), or in hydrofluoric acid (HF)-based baths. Preferably, the dopant which is used is phosphor (P).

For example, the regulation layer 2 is a phosphor-doped glass layer having a thickness of about 1 μm. Furthermore, the concentration of phosphor dopant is 3% by weight relative to the silicon dioxide.

Subsequently, a non-doped first silicon dioxide layer 3, called lower coating or cladding buffer layer is deposited on top of the regulation layer 2 of the p-type. Such lower cladding layer 3 has, for example, a thickness of 15 μm.

A core layer 4 is deposited on the lower cladding layer 3, again in silicon dioxide. Such core layer 4 is doped, for example, with germanium, but also other dopants can be used, such as phosphor, nitrogen oxide, and alumina.

It should be noted that such core layer 4 has, for example, a thickness of 3-4 μm and, in the case of doping with germanium, it has a refractive index $n_{core}$ about 1% more than the $n_{cladding}$ of the lower cladding layer 3.

Figure 4:
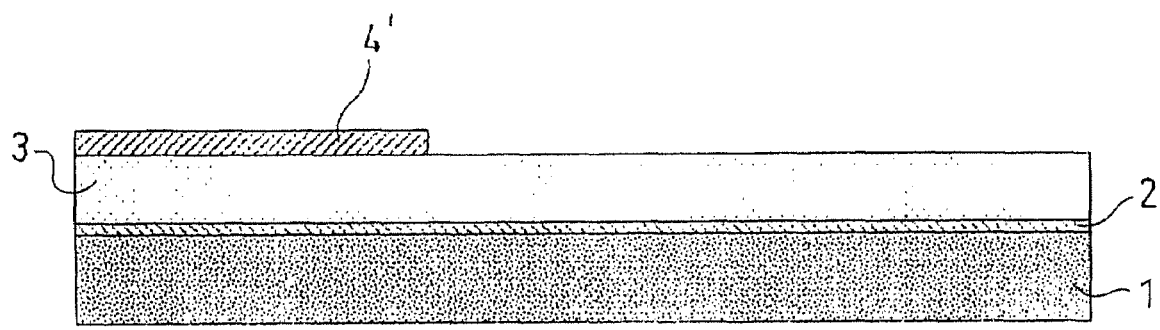

Furthermore, with reference to the FIG. 4, such core layer 4 is subjected to a known photolithographic process, following which the layout of one or more cores 4' of the waveguide of the integrated optical device 100 which is designed is obtained.

Subsequently, the manufacturing process of the invention provides the deposition of a second coating layer, or upper cladding layer 5. In particular, such upper cladding layer 5 will superiorly and laterally coat each lane 4' of the layout which is obtained from the core layer 4.

Such upper cladding layer 5 is preferably in silicon dioxide with a thickness of about 15 μm. Furthermore, the upper cladding layer 5 can be doped with boron and phosphor in concentrations such as the upper cladding layer 5 essentially has the same refractive index $n_{cladding}$ of the lower cladding layer 3.

As those skilled in the art well know, under the condition $n_{core} > n_{cladding}$ the light radiation propagates in the waveguide device 100 essentially inside an optical path which is defined by the core 4'.

Figure 5:
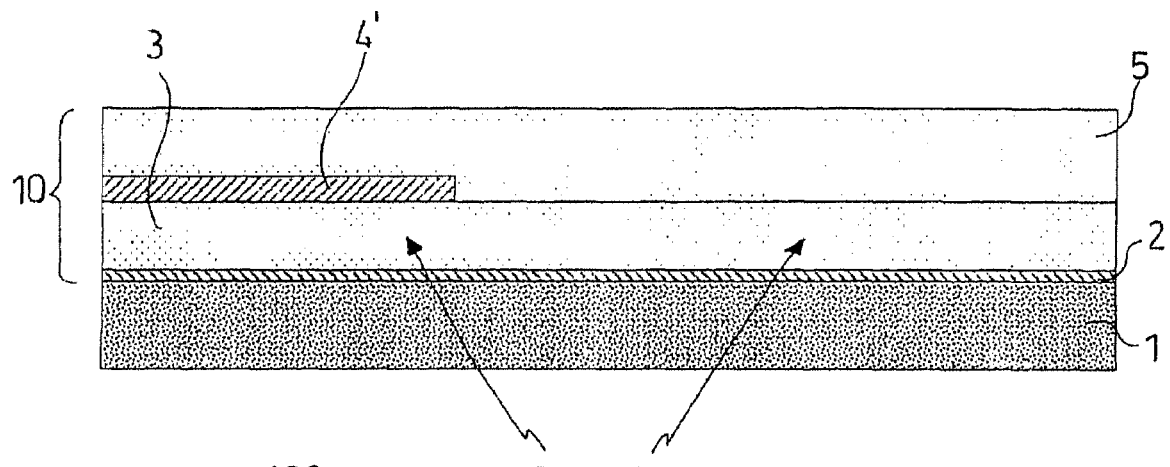
FIG. 5 shows a deposition step of a second coating layer of the guide core layer.
Figure 6:
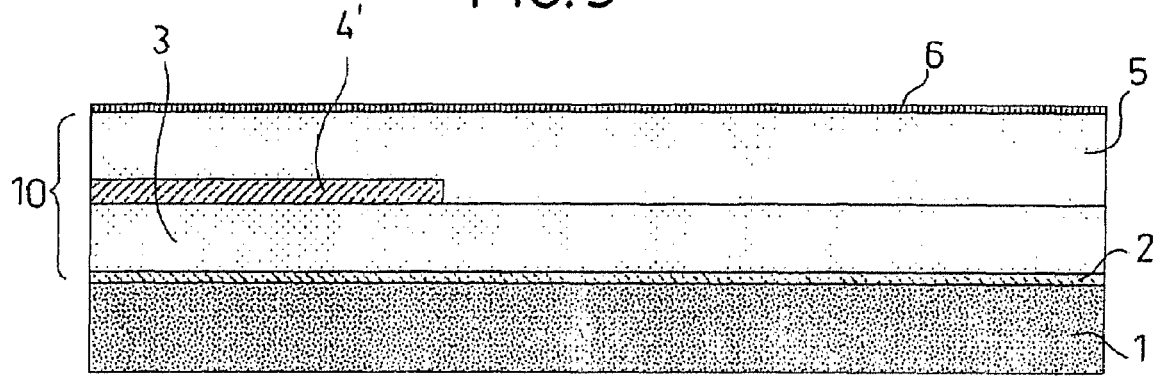
FIGS. 6 and 7 show, in sequence, a deposition step of a hard mask on the waveguide device of the invention and an opening creation step on said hard mask.
Figure 7:
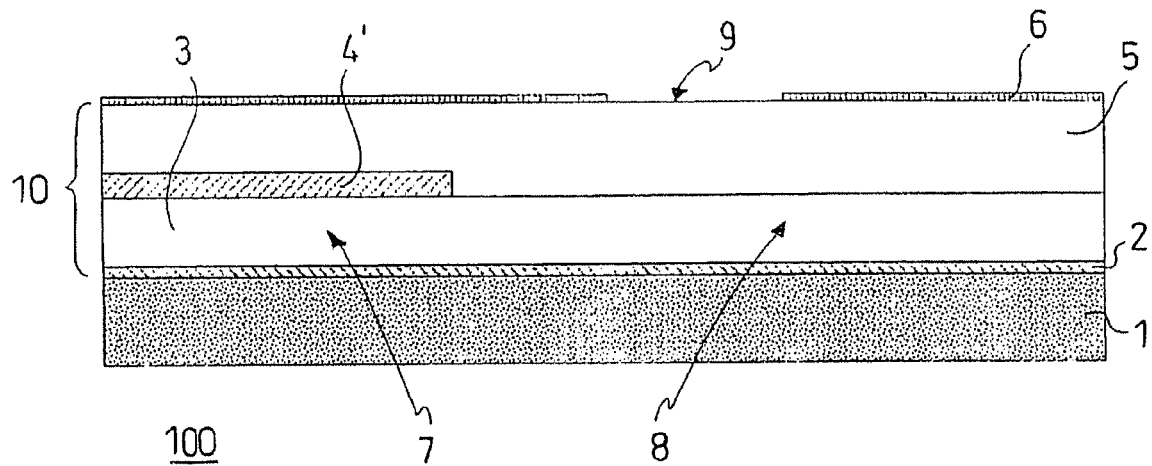

With reference to the FIG. 5, it should be noted that the regulation layer 2, the lower 3 and upper 5 cladding layers, and the core 4' form a multilayer 10 of the integrated optical device 100. Such multilayer 10 can be divided in a first region 7 including the core 4', and a second region 8 adjacent such first region 7.

A successive masking step of the integrated device 100 provides for the deposition of a hard mask 6 on the multilayer 10. Preferably, the hard mask 6 is manufactured in polysilicon.

As is known, such hard mask 6 ensures a high selectivity and protection of the layers below during a successive plasma etching step.

In fact, by means of a further photolithographic process, the hard mask 6 is selectively removed from the device 100 in order to obtain an opening 9 above the above-mentioned multilayer second region 8.

At this point, a dry etching step by means of plasma allows sequentially removing the silicon oxide layers of the upper cladding layer 5, the lower cladding layer 3, and the regulation layer 2 which are located below such opening 9 and are not protected by the hard mask 6.

It should be noted that, as is known to those skilled in the art, the above-mentioned dry etching is of an anisotropic type, that is an etching speed in the direction which is perpendicular to the surface to be etched is mush higher than the etching speed in the lateral direction.

Figure 8:
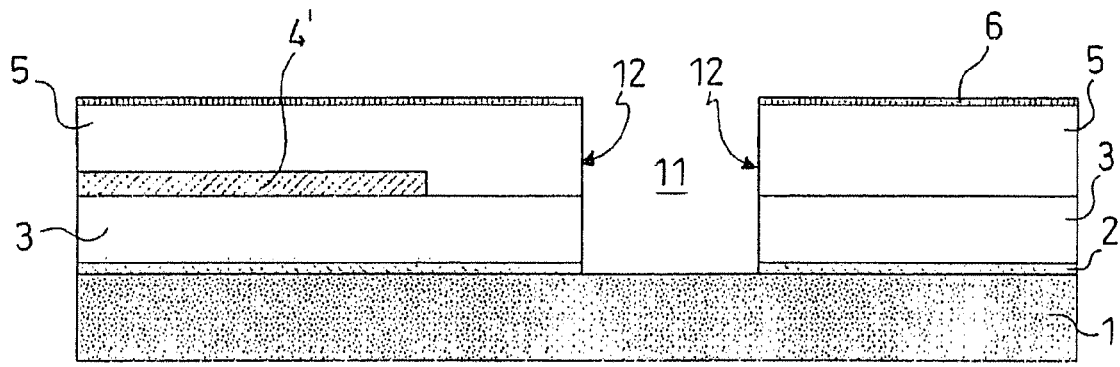
FIG. 8 shows in a sectional view the result of a plasma etching step of the device of FIG. 7 according to the process of the invention.

In other words, at the end of the dry etching step, in the multilayer 10 second region 8 a cavity 11 is obtained which has walls 12 which are essentially perpendicular to the substrate 1 (FIG. 8).

The process of the invention provides a further etching step which is described with reference to the FIGS. 9-11. In particular, such step is a wet etching which can be performed by employing liquid-phase chemicals such as, for example, hydrofluoric acid solutions capable of etching the multilayer 10 silicon oxide, but not the substrate 1 silicon and the hard mask 6 polysilicon.

The above-mentioned wet etching is typically isotropic, that is non-directional. Therefore, as indicated by the arrows F, such etching would tend to remove the multilayer 10 silicon dioxide in an uniform manner, starting from the cavity 11 walls 12 in a direction parallel to the substrate 1.

It should be however noted that a first etching speed associated to the regulation layer 2 is distinguished from the respective etching speeds of the lower 3 and upper 5 cladding layers.

Advantageously, such first etching speed is higher than those of the lower 3 and upper 5 cladding layers.

Figure 9:
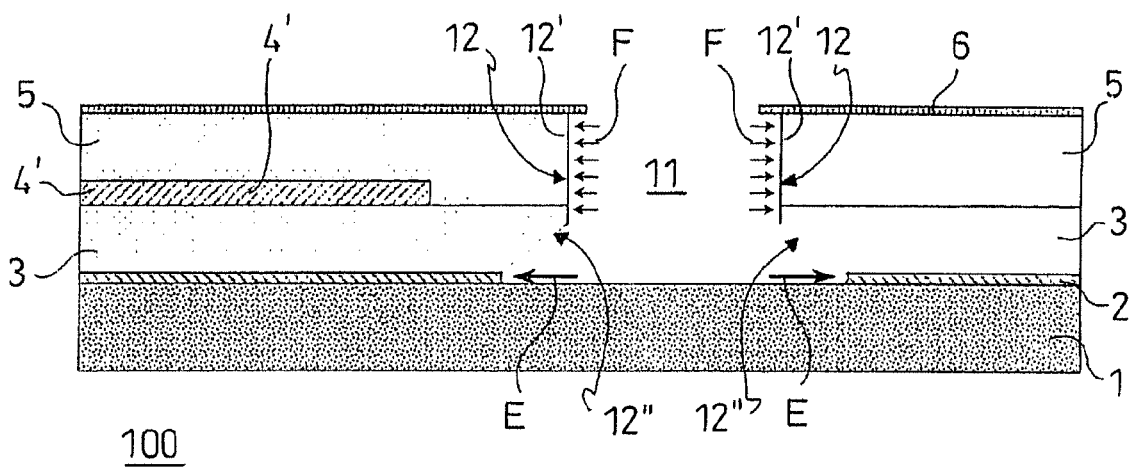
FIGS. 9, 10, and 11 show intermediate steps of the process according to the invention.
Figure 10:
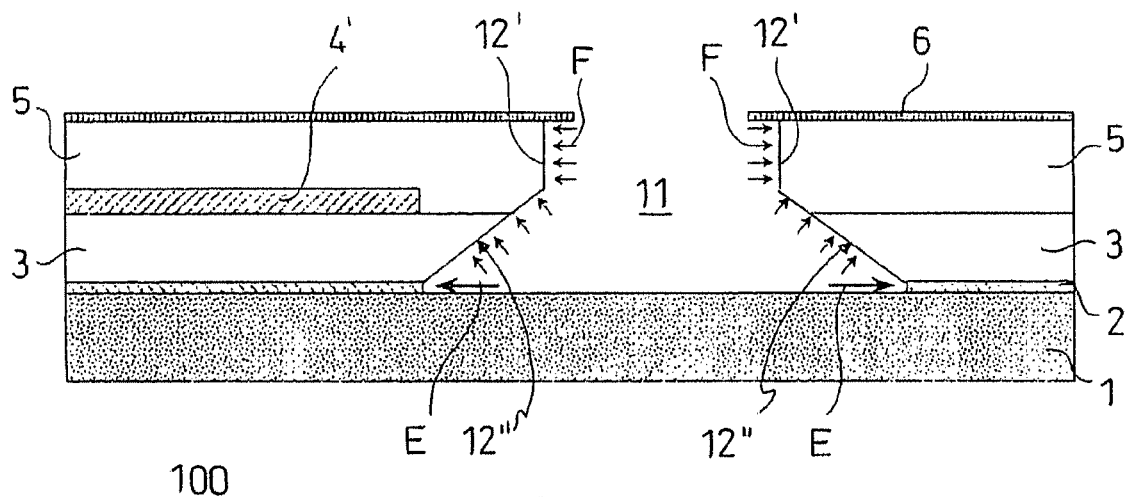

In this manner, as indicated by the arrows E in the FIGS. 9 and 10, during the wet etching which tends to enlarge the cavity 11, the regulation layer 2 silicon oxide and that of a lower cladding layer 3 portion adjacent the above-mentioned regulation layer 2, are etched and removed by a higher extent than the silicon oxide composing the upper cladding layer 5.

Therefore, while a first portion 12' of the walls 12 which is arranged in the proximity of the hard mask 6 remains essentially vertical, such walls 12 have a second inclined portion 12" in the proximity of the substrate 1.

Proceeding with the wet etching step, the duration of which can be, for example, 15-20 minutes, the walls 12 first vertical portion 12' is gradually reduced. In other words, the multilayer 10 oxide portion which is removed at a constant speed in the direction parallel to the substrate 1 is reduced.

On the contrary, upon proceeding with the wet etch, the wall 12 second portion 12" enlarges, that is the multilayer 10 oxide portion which is removed according to an increasing speed gradient towards the substrate 1 is increased.

Figure 11:
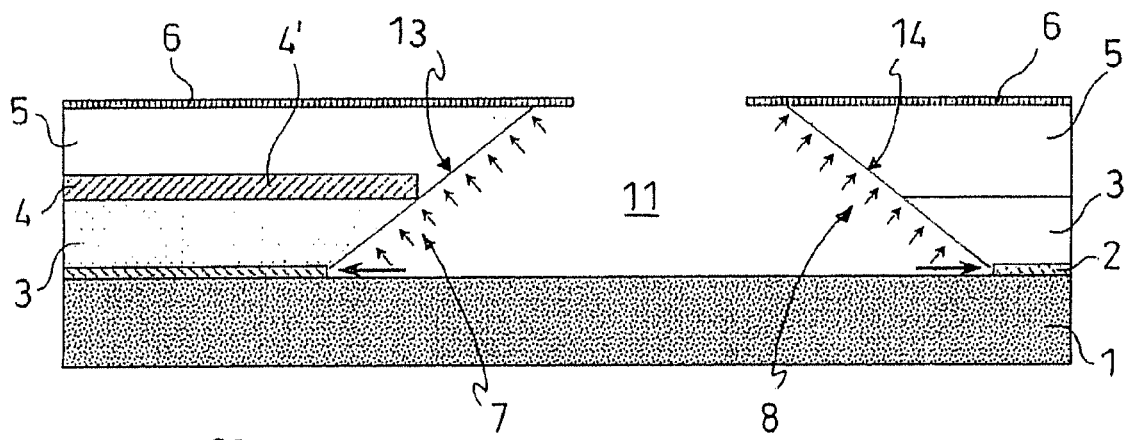

With reference to the FIG. 11, at the end of such wet etching step, the cavity 11 is defined by first 13 and second 14 walls which are inclined relative to the substrate 1 and sandwiched between the hard mask 6 layer and the substrate 1.

In particular, it should be noted that a first inclined wall 13 extends at least partially in the multilayer 10 first region 7 so as to turn out to be in the proximity of an end 15 of the core 4'. Such end 15 represents an inlet/outlet port for the light radiation propagating into the guide core 4'.

For example, the inclination of such walls 13 and 14 relative to the substrate 1 ranges between 15 and 40 degrees.

It should be noted, in particular, that the regulation layer 2 first etching speed is variable as a function of the phosphor (P) concentration which is employed to dope such layer 2. Consequently, the walls 13 and 14 inclination relative to the substrate 1 is advantageously adjustable by varying such phosphor concentration. Furthermore, such inclination is also adjustable by controlling the etching solution temperature and composition.

Figure 12:
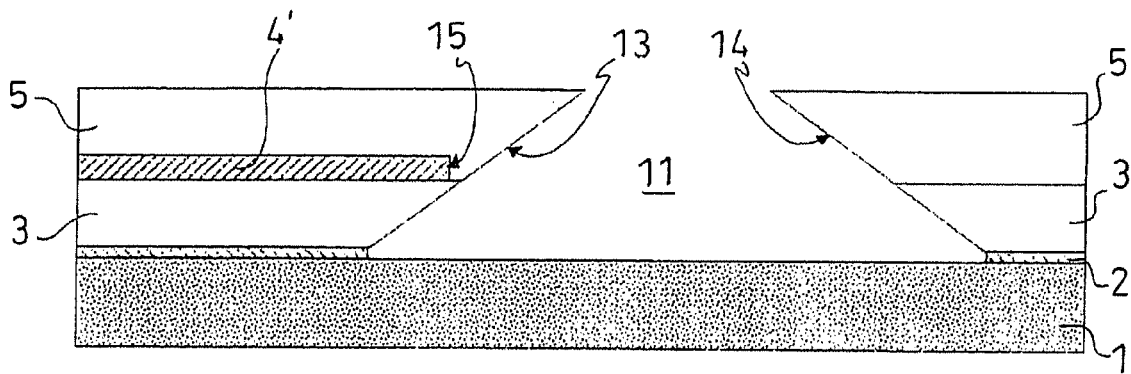
FIG. 12 shows in a sectional view a structure of a waveguide optical device provided with a turning mirror obtained by means of the process according to the invention.

The manufacturing process of the integrated optical device 100 ends with the hard mask 6 removal (FIG. 12).

It should be noted that, advantageously, such first inclined wall 13 of the waveguide device 100 represents a turning mirror to deviate a light radiation propagating in the guide. In particular, such mirror 13 is within the waveguide device 100 structure.

Furthermore, according to such mirror 13 inclination relative to the substrate 1, such light radiation can be suitably deviated towards a receiving optoelectronic device.

Figure 13:
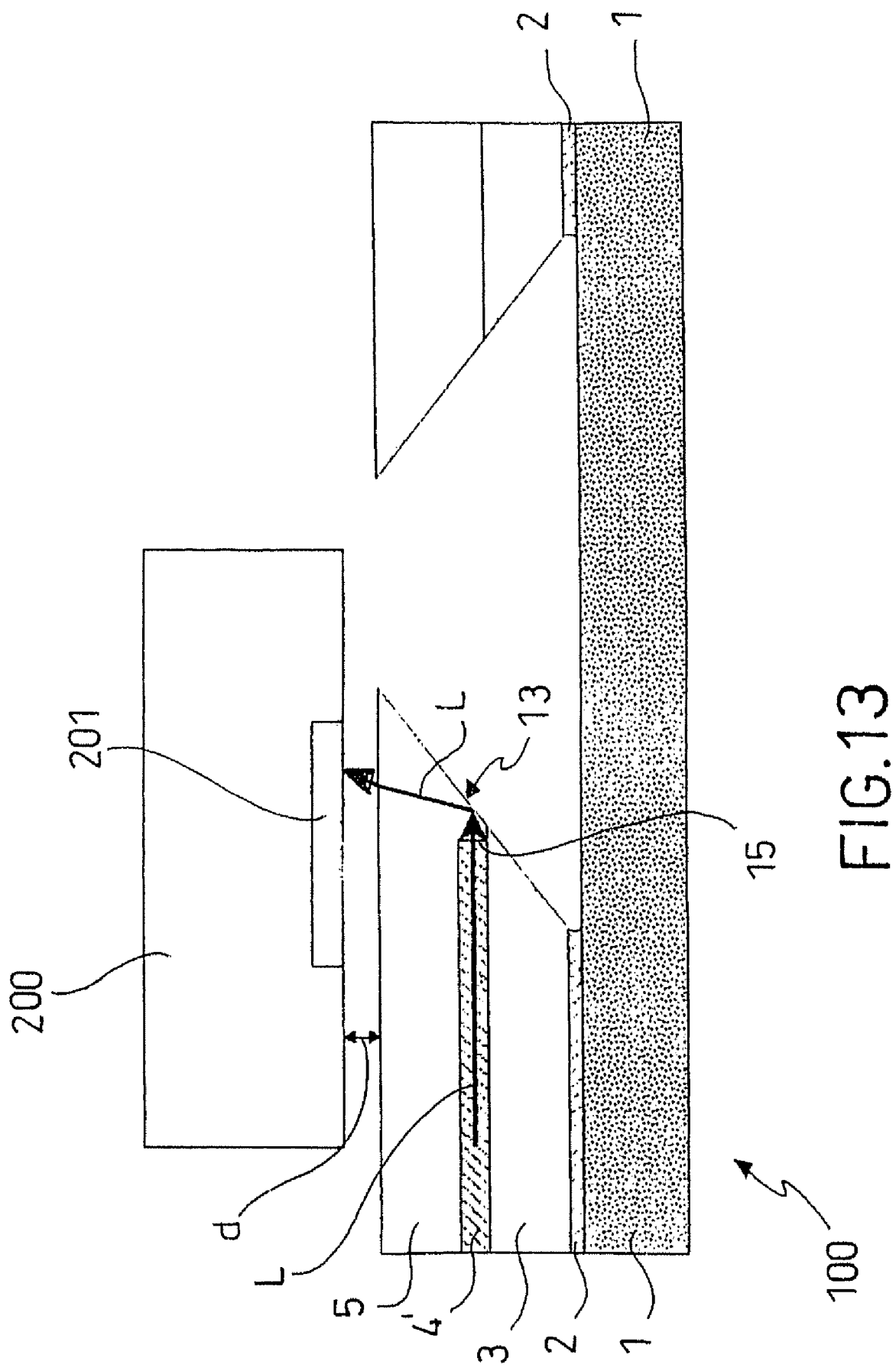
FIG. 13 schematically shows an operational example of the integrated optical device obtained by means of the process according to the invention.

In this regard, an example of a hybrid circuit comprising the waveguide optical device 100 of the invention coupled to a further optical device 200 is schematically shown in FIG. 13.

In particular, such further optical device 200 can be a light radiation detecting optoelectronic device.

The above-mentioned optoelectronic device 200 can be, for example, an avalanche photodiode or APD, or a PIN (P-intrinsic-N) diode, that is, a photodetecting device which is adapted to receive the light radiation and convert it into an electrical signal.

It should be noted that such optoelectronic device 200 can be arranged above the waveguide device 100, thus turning out to be spaced from the upper cladding layer 5 by an interspace d. Such interspace d has, for example, a width of about 5 µm.

In this case, a light radiation L propagating in the waveguide device 100 is partially reflected by the first inclined wall 13, thus being deviated towards the photodetector 200.

It should be noted, in particular, that the optical path of the light radiation L passes through the upper cladding layer 5 and, in the proximity of the photodetector 200, it passes through the short interspace d in the air. Then, the radiation L reaches an active region 201 of the same photodetector 200 acting as a light radiation collector.

In other terms, the light radiation L optical path is mostly confined inside the waveguide device 100.

Furthermore, it should be noted that the further optical device 200 can also be a transmitting-type optoelectronic device. For example, such transmitting device 200 can be a VCSEL (Vertical Cavity Surface Emitting Laser), or a surface emitting LED (Light Emitting Diode) adapted to transmit the above-indicated light radiation L.

In particular, the light radiation L emitted by such transmitting optoelectronic device 200 can be sent onto the optical device 100 core 4' of the invention by exploiting the reflection effect of the mirror 13. In such case, it is necessary that the radiation which is emitted is incident on the upper cladding layer 5 by a prefixed angle as a function of the mirror 13 inclination.

Also in this case, the light radiation L optical path would be mostly confined inside the waveguide device 100.

Furthermore, the further optical device 200 can be a passive optical device adapted to couple the electromagnetic radiation L coming from the waveguide device 100 with a further optical guide. For example, such passive optical device is an optical mirror, an integrated micro-optic device of the Bragg grating-type, or a holographic device.

Advantageously, the process of the invention allows manufacturing waveguide devices 100 in which the attenuation and spatial dispersion effects (for example, reduction of the light signal power, widening of the beam) which a light radiation L beam could undergo due to refractive index differentials upon passing from the waveguide into the air are negligible.

Furthermore, the reduction of the undesired spatial dispersion effects improves the coupling between such waveguide device 100 and the photodetecting optoelectronic devices 200. In fact, in many applications high-sensitive photodetectors can be used, that is having reduced active regions 201. In particular, such photodetectors 200 have small parasite capacities, thus turning out to be quicker in the processing of the received optical signals.

Furthermore, it should be noted that the manufacturing of the waveguide device 100 is compatible with the photolithographic technologies which are used in the field, and the operational steps which are used can be implemented in an easy and not much expensive manner.

In addition, metallization layers to manufacture the optical device 100 turning mirror 13 are not necessary.

Furthermore, it should be noted that it is possible to manufacture an integrated optical device 100 comprising a further core arranged in the multilayer 10 second region 8 (not show in the Figures) by using the same process steps which have been described. Such further core can be defined starting from the core layer 4 during the photolithographic process creating the core 4', that is by removing a central portion of such layer 4 in order to separate the above-mentioned further core from the core 4'.

Ultimately, such further core comprises a respective light radiation inlet/outlet port arranged in the proximity of the second inclined wall 14.

Furthermore, the integrated optical device 100 manufactured by the process of the invention can be used in a number of telecommunication applications, such as, for example, in optical fibre communication networks of the PON (Passive Optical Network) type based on the use of a Diplexer/Triplexer.

In particular, it should be noted that in the PON networks each single optical fibre extends from an optical transceiver arranged at the service provider to a device which is called beam splitter, arranged in the proximity of the users. The optical transceiver divides the light signals in N output channels (typically, N is equal to 16 or 32 channels) directionable towards the single users.

Of course, those of ordinary skill in the art, with the aim of meeting specific, contingent needs, will be able to make further modifications and variations to the process of the present invention, all of which are nonetheless within the protection scope of the invention, as defined by the following claims.

The invention claimed is:

1. A process for manufacturing an integrated optical device comprising the steps of:
   depositing on a support substrate a multilayer comprising first and second cladding layer in order to hold in a multilayer first region a core layer of a waveguide of the optical device, said core being provided with an electromagnetic radiation inlet/outlet port;
   forming a regulation layer at least in said multilayer first region having associated a first etching speed which is distinguished from respective etching speeds of said first and second cladding layers;
   etching a multilayer second region adjacent said first region, thus obtaining a cavity having a first wall which inclined relative to the substrate such as to at least partially extend in said first region and turning out to be near said inlet/outlet port, said etching resulting in a removal of portions of the regulation layer and the cladding layers at different speeds, in order to cause the formation of said first inclined wall; and positioning said regulation layer between said core and said substrate.

2. The process according to claim 1, wherein said first inclined wall comprises a surface within the multilayer which is facing the core inlet/outlet port adapted to reflect the electromagnetic radiation entering/exiting said port.

3. The process according to claim 1, wherein said first etching speed of said regulation layer is higher than the etching speeds of said first and second cladding layers.

4. The process according to claim 1, wherein said formation step of the regulation layer comprises the deposition step on the substrate of a p-type doped silicon dioxide layer.

5. The process according to claim 4, wherein said regulation layer has a thickness of about 1 μm and is doped with phosphor; the phosphor being 3% by weight relative to the silicon dioxide.

6. The process according to claim 1, wherein said etching step forms a cavity second wall which is inclined relative to the substrate such as to extend in said second region and turning out to be opposite said first wall.

7. The process according to claim 1, wherein said first and second inclined walls have an inclination relative to the substrate ranging between 15-40 degrees.

8. A process for manufacturing an integrated optical device comprising the steps of:

depositing on a support substrate a multilayer comprising first and second cladding layer in order to hold in a multilayer first region a core layer of a waveguide of the optical device, said core being provided with an electromagnetic radiation inlet/outlet port;

forming a regulation layer at least in said multilayer first region having associated a first etching speed which is distinguished from respective etching speeds of said first and second cladding layers; and etching a multilayer second region adjacent said first region, thus obtaining a cavity having a first wall which inclined relative to the substrate such as to at least partially extend in said first region and turning out to be near said inlet/outlet port, said etching resulting in a removal of portions of the regulation layer and the cladding layers at different speeds, in order to cause the formation of said first inclined wall, said etching step further comprising performing an anisotropic etching through an opening of a multilayer protective mask in order to open said cavity in the multilayer provided with walls which are essentially orthogonal to the substrate; and performing a second wet etching in order to enlarge said cavity by creating said first and second inclined walls.

9. The process according to claim 8, wherein said an isotropic etching is a dry etching performed by means of plasma.

10. The process according to claim 8, wherein said second wet etching is performed by employing hydrofluoric acid-based solutions.

11. The process according to claim 7, wherein the inclination of said first and second inclined walls can be adjusted by varying the dopant concentration of the regulation layer.

12. A process for manufacturing an integrated optical device comprising the steps of:

depositing on a support substrate a multilayer comprising first and second cladding layer in order to hold in a multilayer first region a core layer of a waveguide of the optical device, said core being provided with an electromagnetic radiation inlet/outlet port;

forming a regulation layer at least in said multilayer first region having associated a first etching speed which is distinguished from respective etching speeds of said first and second cladding layers;

etching a multilayer second region adjacent said first region, thus obtaining a cavity having a first wall which inclined relative to the substrate such as to at least partially extend in said first region and turning out to be near said inlet/outlet port, said etching resulting in a removal of portions of the regulation layer and the cladding layers at different speeds, in order to cause the formation of said first inclined wall, wherein said deposition step of the multilayer comprises the further steps of:

depositing the first cladding layer above said regulation layer, said first layer being non-doped silicon dioxide;

depositing the core layer above said first cladding layer, said core layer being germanium-doped silicon dioxide;

performing a photolithographic process of said core layer in order to obtain the layout of the waveguide core in said multilayer first region;

covering said core by means of the second cladding layer, said second cladding layer being boron and phosphor-doped silicon dioxide.

13. The process according to claim 12, wherein said core layer has a thickness of about 3-4 μm, and it can be doped also with phosphor, nitrogen oxide, and alumina.

14. The process according to claim 12, wherein said first and second cladding layers have thicknesses of about 15 μm and a same refractive index.

15. An integrated optical device comprising:

a multilayer deposited on a support substrate, the multilayer including first and second cladding layers in order to hold in a multilayer first region a core layer of a waveguide of the optical device, said core being provided with at least an electromagnetic radiation inlet/outlet port;

a cavity obtained in a multilayer second region adjacent said first region, said cavity being provided with a first wall which is inclined relative to the substrate such as to at least partially extend in said first region and turning out to be near said inlet/outlet port;

a regulation layer at least a portion of which is positioned in said multilayer first region sandwiched between the substrate and the first cladding layer, said regulation layer having associated a first etching speed distinguished from respective etching speeds of said first and second cladding layers.

16. The integrated optical device according to claim 15, comprising a further waveguide core layout in said multilayer second region, said further core having a respective electromagnetic radiation inlet/outlet port in the proximity of a second wall of said cavity which is inclined relative to the substrate and opposite said first wall.

17. An optical system comprising:

the integrated optical device in accordance with the claim 15 to allow the propagation of an electromagnetic radiation;

a further optical device coupled to said optical device.

18. The optical system according to claim 17, wherein said further optical device is a photodetector of the APD or PIN type which is secured on said integrated optical device and provided with an active region in order to receive said electromagnetic radiation.

19. The optical system according to claim 17, wherein said further optical device is a VCSEL or a surface emitting LED to transmit said electromagnetic radiation.

20. The optical system according to claim 17, wherein said further optical device is a passive optical device for the coupling of the electromagnetic radiation coming from said integrated optical device to an optical guide.

21. The optical system according to claim 20, wherein said passive optical device is an optical mirror, an integrated micro-optic device of the Bragg grating-type, or a holographic device.

22. The integrated optical device according to claim 15, wherein said regulation layer is positioned between said core and said substrate.

23. The integrated optical device according to claim 15, wherein the first inclined wall is on a side of the cavity closest to the inlet/outlet port and the cavity is further provided with a second inclined wall which is spaced apart across the cavity from the first inclined wall.

24. The process according to claim 15, wherein the first inclined wall is on a side of the cavity closest to the inlet/outlet port and the cavity is further provided with a second inclined wall which is spaced apart across the cavity from the first inclined wall.

* * * * *